United States Patent
Becker et al.

(10) Patent No.: US 12,157,795 B2
(45) Date of Patent: Dec. 3, 2024

(54) SYNTHESIS OF MG(BHT)₂(THF)₂

(71) Applicants: Matthew Becker, Chapel Hill, NC (US); Alex P. Kleinfehn, Cuyahoga Falls, OH (US); Shannon R. Petersen, Youngwood, PA (US)

(72) Inventors: Matthew Becker, Chapel Hill, NC (US); Alex P. Kleinfehn, Cuyahoga Falls, OH (US); Shannon R. Petersen, Youngwood, PA (US)

(73) Assignee: The University of Akron, Akron, OH (US)

( * ) Notice: Subject to any disclaimer, the term of this patent is extended or adjusted under 35 U.S.C. 154(b) by 1076 days.

(21) Appl. No.: 16/979,348

(22) PCT Filed: Aug. 29, 2018

(86) PCT No.: PCT/US2018/048421
§ 371 (c)(1),
(2) Date: Sep. 9, 2020

(87) PCT Pub. No.: WO2019/172950
PCT Pub. Date: Sep. 12, 2019

(65) Prior Publication Data
US 2021/0002421 A1    Jan. 7, 2021

Related U.S. Application Data

(60) Provisional application No. 62/640,618, filed on Mar. 9, 2018.

(51) Int. Cl.
*C07F 3/02*      (2006.01)
*C08G 63/82*     (2006.01)

(52) U.S. Cl.
CPC .............. *C08G 63/823* (2013.01); *C07F 3/02* (2013.01)

(58) Field of Classification Search
CPC ........................................................ C07F 3/02
See application file for complete search history.

(56) References Cited

PUBLICATIONS

Wilson, et al; Synthesis of w-Pentadecalactone Copolymers with Independently Tunable Thermal and Degradation Behavior, Macromolecules, vol. 48, Feb. 13, 2015 [retrieved on Oct. 4, 2018] Retrieved from the Internet URL: https://pubs.acs.org/doi.abs/10.0121/ma5022049. pp. 950-958.

Fang, et al; e-Caprolactone polymerization under air by the biocatalyst; Magnesium 2,6-di-tert-butyl-4-methylphenoxide, Journal of Polymer Science Part A; Polymer Chemistry. Bol. 50, Apr. 5, 2012 [retrieved on Oct. 4, 2018]. Retrieved from the Internet: <URL>: https://onlinelibrary.wiley.com/doi/pdf/10.1002/pola.26054> pp. 2697-2704.

*Primary Examiner* — John S Kenyon
(74) *Attorney, Agent, or Firm* — Renner, Kenner, Greive Bobak, Taylor & Weber Co., LPA

(57) ABSTRACT

In one or more embodiments, the present invention is directed to a novel method for synthesizing Mg(BHT)₂(THF)₂ catalyst, which has several advantages over previous methods. Dry toluene or pentane are not required for synthesizing the catalyst, and the reaction is done in a bulk solution of BHT and THF. Further, because the Mg(BHT)₂(THF)₂ is made in a one-step ("one-pot") synthesis, the time required for synthesizing and drying the catalyst is reduced. Using the new method of the present invention, the Mg(BHT)₂(THF)₂ is pure after removing excess THF, thereby eliminating the need for washes and recrystallization.

17 Claims, 4 Drawing Sheets

SYNTHESIS OF MG(BHT)$_2$(THF)$_2$

CROSS REFERENCE TO RELATED APPLICATIONS

This application claims the benefit of International application serial number PCT/US18/48421 entitled "Improved Synthesis of Mg(BHT)$_2$(THF)$_2$," filed Aug. 29, 2018, which claims the benefit of U.S. provisional patent application Ser. No. 62/640,618 entitled "Improved Synthesis of MG(BHT)$_2$ (THF)$_2$," filed Mar. 9, 2018, and incorporated herein by reference in its entirety.

NAMES OF THE PARTIES TO A JOINT RESEARCH AGREEMENT

The present application stems from work done pursuant to a Joint Research Agreement between The University of Akron of Akron, OH and 3DBioActives, LLC of Akron, OH.

FIELD OF THE INVENTION

One or more embodiments of the present invention relates to a method for making magnesium catalysts. In certain embodiments, the present invention relates a method of making Mg(BHT)$_2$(THF)$_2$ catalysts for ring opening polymerization reactions.

BACKGROUND OF THE INVENTION

Polyesters can be generated through the ring-opening polymerization of lactones using a magnesium catalyst, magnesium 2,6-di-tert-butyl-4-methylphenoxide-tetrahydrofuran (Mg(BHT)$_2$(THF)$_2$). Researchers have been able to homopolymerize δ-valerolactone (δVL), ε-caprolactone (ECL), η-caprylolactone (ηCL), ω-dodecalactone (DDL), copolymerize these with ω-pentadecalactone (PDL), form sequential copolymers in the presence of a substituted lactones, such as menthide (MI), and copolymerize maleic anhydride and propylene oxide using a functional alcohol initiator, using Mg(BHT)$_2$(THF)$_2$. A method for generating Mg(BHT)$_2$(THF)$_2$ was described by Calabrese et al. In this method, di-n-butylmagnesium (BU$_2$Mg) (1M in heptane) is added to a solution of 2,6-di-tert-butyl-4-methylphenol (BHT) in dry toluene under anhydrous conditions and the resulting product, (Mg(BHT)$_2$)$_2$, is dried under reduce pressure (Yield=68%). The (Mg(BHT)$_2$)$_2$ is then dissolved in dry pentane and complexed with tetrahydrofuran (THF) and before being recrystallized in THF to yield the Mg(BHT)$_2$(THF)$_2$ (yield=88%). See, Calabrese, J.; Cushing, M. A; Ittel, S. D., "Sterically hindered magnesium aryloxides." *Inorganic Chemistry* 1988, 27 (5), 867-870. Problems with this method include a reduction in yield as a result of this two-step reaction, the use of dry toluene and pentane which requires additional time and space for their drying and storage (or the expense of purchasing these anhydrous solvents from a supplier), and the need for recrystallization in THF to purify Mg(BHT)$_2$(THF)$_2$.

An alternative method for synthesizing Mg(BHT)$_2$(THF)$_2$ was discovered by Nifant'ev et al. See, Nifant'ev, I. E.; Shlyakhtin, A V.; Bagrov, V. V.; Minyaev, M. E.; Churakov, A V.; Karchevsky, S. G.; Birin, K. P.; Ivchenko, P. V., "Mono-BHT heteroleptic magnesium complexes: synthesis, molecular structure and catalytic behavior in the ring-opening polymerization of cyclic esters." *Dalton Transactions* 2017, 46 (36), 12132-12146. In this method, BHT is dissolved in dry THF and added dropwise to a solution of BU$_2$Mg, stirred for 1 hour, then dried under reduced pressure. The residue is then washed with hexane and recrystallized from THF/toluene/hexane mixture (1:10:50) to yield pure Mg(BHT)$_2$(THF)$_2$ (reported yield=90%). While this method improves upon prior methods by removing the need for dry toluene and pentane, simplifying the reaction, and improving yields, it still requires washing and recrystallization to purify the Mg(BHT)$_2$(THF)$_2$.

What is needed in the art is method for synthesizing Mg(BHT)$_2$(THF)$_2$ which takes less time and results in significant enhancements in yield and purity.

SUMMARY OF THE INVENTION

In one or more embodiments, the present invention provides an improved method for synthesizing Mg(BHT)$_2$ (THF)$_2$ that takes less time and results in significant enhancements in yield and purity while avoiding the use of dry toluene and pentane and the time consuming washing and recrystallization steps of prior methods.

In a first aspect, the present invention is directed to a method for making a magnesium 2,6-di-tert-butyl-4-methylphenoxide-tetrahydrofuran (Mg(BHT)$_2$(THF)$_2$) catalyst comprising dissolving di-n-butylmagnesium in a suitable solvent to form a di-n-butylmagnesium solution; dissolving 2,6,di-tert-butyl-4-methylphenol in anhydrous tetrahydrofuran (THF) to form a 2,6,di-tert-butyl-4-methylphenol/THF solution; and adding the di-n-butylmagnesium solution to the 2,6,di-tert-butyl-4-methylphenol/THF solution; wherein the di-n-butylmagnesium reacts with the 2,6,di-tert-butyl-4-methylphenol and THF to form the Mg(BHT)$_2$(THF)$_2$ catalyst. In one or more embodiments, the suitable solvent is selected from hexane, heptane, octane, and combinations thereof.

In one or more embodiments, the method for making a Mg(BHT)$_2$(THF)$_2$ catalyst includes any one or more of the above referenced embodiments of the first aspect of the present invention wherein the concentration of di-n-butylmagnesium in the di-n-butylmagnesium solution is from about 0.5 to about 5.0. In one or more embodiments, the method for making a Mg(BHT)$_2$(THF)$_2$ catalyst includes any one or more of the above referenced embodiments of the first aspect of the present invention wherein the concentration of di-n-butylmagnesium in the di-n-butylmagnesium solution is 1M. In one or more embodiments, the method for making a Mg(BHT)$_2$(THF)$_2$ catalyst includes any one or more of the above referenced embodiments of the first aspect of the present invention wherein the molar ratio of di-n-butylmagnesium to 2,6,di-tert-butyl-4-methylphenol in the step of adding is from about 1:2 to about 1:2.05.

In one or more embodiments, the method for making a Mg(BHT)$_2$(THF)$_2$ catalyst includes any one or more of the above referenced embodiments of the first aspect of the present invention wherein the step of adding further comprises adding the di-n-butylmagnesium solution dropwise to the 2,6,di-tert-butyl-4-methylphenol/THF solution over a water bath, ice bath, or heat sink at ambient temperature. In one or more embodiments, the method for making a Mg(BHT)$_2$(THF)$_2$ catalyst includes any one or more of the above referenced embodiments of the first aspect of the present invention further comprising: stirring the combination until substantially all of the di-n-butylmagnesium and 2,6,di-tert-butyl-4-methylphenol have reacted; and removing any unreacted THF and remaining solvent to produce the Mg(BHT)$_2$(THF)$_2$ catalyst. In one or more embodiments, the method for making a Mg(BHT)$_2$(THF)$_2$ catalyst includes any one or more of the above referenced embodiments of the first aspect of the present invention wherein the step of stirring comprises stirring the combination for from about 90 min to about 210 min. In one or more embodiments, the method for making a $Mg(BHT)_2(THF)_2$ catalyst includes any one or more of the above referenced embodiments of the first aspect of the present invention wherein the step of removing comprises removing unreacted THF and remaining solvent by evaporation under reduced pressure.

In one or more embodiments, the method for making a $Mg(BHT)_2(THF)_2$ catalyst includes any one or more of the above referenced embodiments of the first aspect of the present invention wherein the yield of the $Mg(BHT)_2(THF)_2$ catalyst is 80% or greater by weight. In one or more embodiments, the method for making a $Mg(BHT)_2(THF)_2$ catalyst includes any one or more of the above referenced embodiments of the first aspect of the present invention wherein the yield of the $Mg(BHT)_2(THF)_2$ catalyst is 97% or greater by weight. In one or more embodiments, the method for making a $Mg(BHT)_2(THF)_2$ catalyst includes any one or more of the above referenced embodiments of the first aspect of the present invention wherein the purity of the $Mg(BHT)_2(THF)_2$ catalyst produced is 98% or more as calculated $^1H$ NMR.

In a second aspect, the present invention is directed to a one pot method for making a magnesium catalyst comprising: reacting di-n-butylmagnesium, a 2,6-di-tert-butyl-4-methylphenol solution, and anhydrous tetrahydrofuran (THF) at ambient temperature over a water bath, ice bath, or heat sink to form magnesium 2,6-di-tert-butyl-4-methylphenoxide-tetrahydrofuran $(Mg(BHT)_2(THF)_2)$ catalyst; and removing any remaining THF and solvent to produce the $Mg(BHT)_2(THF)_2$ catalyst. In one or more embodiments, the di-n-butylmagnesium is dissolved in heptane. In one or more embodiments, the molar ratio of di-n-butylmagnesium to 2,6-di-tert-butyl-4-methylphenol in the step of reacting is from about 1:2 to about 1:2.05.

In one or more embodiments, the one pot method of the present invention includes any one or more of the above referenced embodiments of the second aspect of the present invention wherein the step of reacting further comprises: dissolving di-n-butylmagnesium in a suitable solvent to form a di-n-butylmagnesium solution combining the 2,6-di-tert-butyl-4-methylphenol and the anhydrous THF in a suitable reaction vessel to form a 2,6-di-tert-butyl-4-methylphenol and THF solution; adding the di-n-butylmagnesium solution dropwise to the 2,6-di-tert-butyl-4-methylphenol and THF solution over a water bath, ice bath or heat sink at ambient temperature to form a $Mg(BHT)_2(THF)_2$ catalyst; and stirring the combination for from about 90 min to about 210 min or until substantially all of the di-n-butylmagnesium and 2,6-di-tert-butyl-4-methylphenol have reacted with THF to form the $Mg(BHT)_2(THF)_2$ catalyst. In one or more embodiments, the one pot method of the present invention includes any one or more of the above referenced embodiments of the second aspect of the present invention wherein the step of removing comprises removing unreacted THF and solvent by evaporation under reduced pressure.

In one or more embodiments, the one pot method of the present invention includes any one or more of the above referenced embodiments of the second aspect of the present invention wherein the yield of the $Mg(BHT)_2(THF)_2$ catalyst is 80% or greater by weight. In one or more embodiments, the one pot method of the present invention includes any one or more of the above referenced embodiments of the second aspect of the present invention wherein the yield of the $Mg(BHT)_2(THF)_2$ catalyst is 95% or greater by weight. In one or more embodiments, the one pot method of the present invention includes any one or more of the above referenced embodiments of the second aspect of the present invention wherein the purity of the $Mg(BHT)_2(THF)_2$ catalyst produced is 98% or more. In one or more embodiments, the one pot method of the present invention includes any one or more of the above referenced embodiments of the second aspect of the present invention wherein the purity of the $Mg(BHT)_2(THF)_2$ catalyst produced is 98% or more.

In a third aspect, the present invention is directed to a method for making magnesium 2,6-di-tert-butyl-4-methylphenoxide.tetrahydrofuran$(Mg(BHT)_2(THF)_2)$ catalyst comprising: dissolving di-n-butylmagnesium in hexane, heptane, or octane to form a 1M di-n-butylmagnesium solution; dissolving 2,6,di-tert-butyl-4-methylphenol in anhydrous tetrahydrofuran (THF) to form a 2,6,di-tert-butyl-4-methylphenol/THF solution; combining the di-n-butylmagnesium solution and the 2,6,di-tert-butyl-4-methylphenol/THF solution at a molar ratio of di-n-butylmagnesium to 2,6,di-tert-butyl-4-methylphenol of from about 1:2 to about 1:2.05 by adding the di-n-butylmagnesium solution dropwise to the 2,6,di-tert-butyl-4-methylphenol/THF solution over a water bath, ice bath, or heat sink at ambient temperature to form a $Mg(BHT)_2(THF)_2$ catalyst; stirring or agitating the combination for from about 90 min to about 210 min or until substantially all of the di-n-butylmagnesium and 2,6,di-tert-butyl-4-methylphenol have reacted with THF to form the $Mg(BHT)_2(THF)_2$ catalyst; and removing any unreacted THF and solvent by evaporation under reduced pressure or rotary evaporation to produce the $Mg(BHT)_2(THF)_2$ catalyst. In some of these embodiments, the yield of the $Mg(BHT)_2(THF)_2$ catalyst is 95% or greater by weight. In some of these embodiments, the purity of the $Mg(BHT)_2(THF)_2$ catalyst produced is 98% or more.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
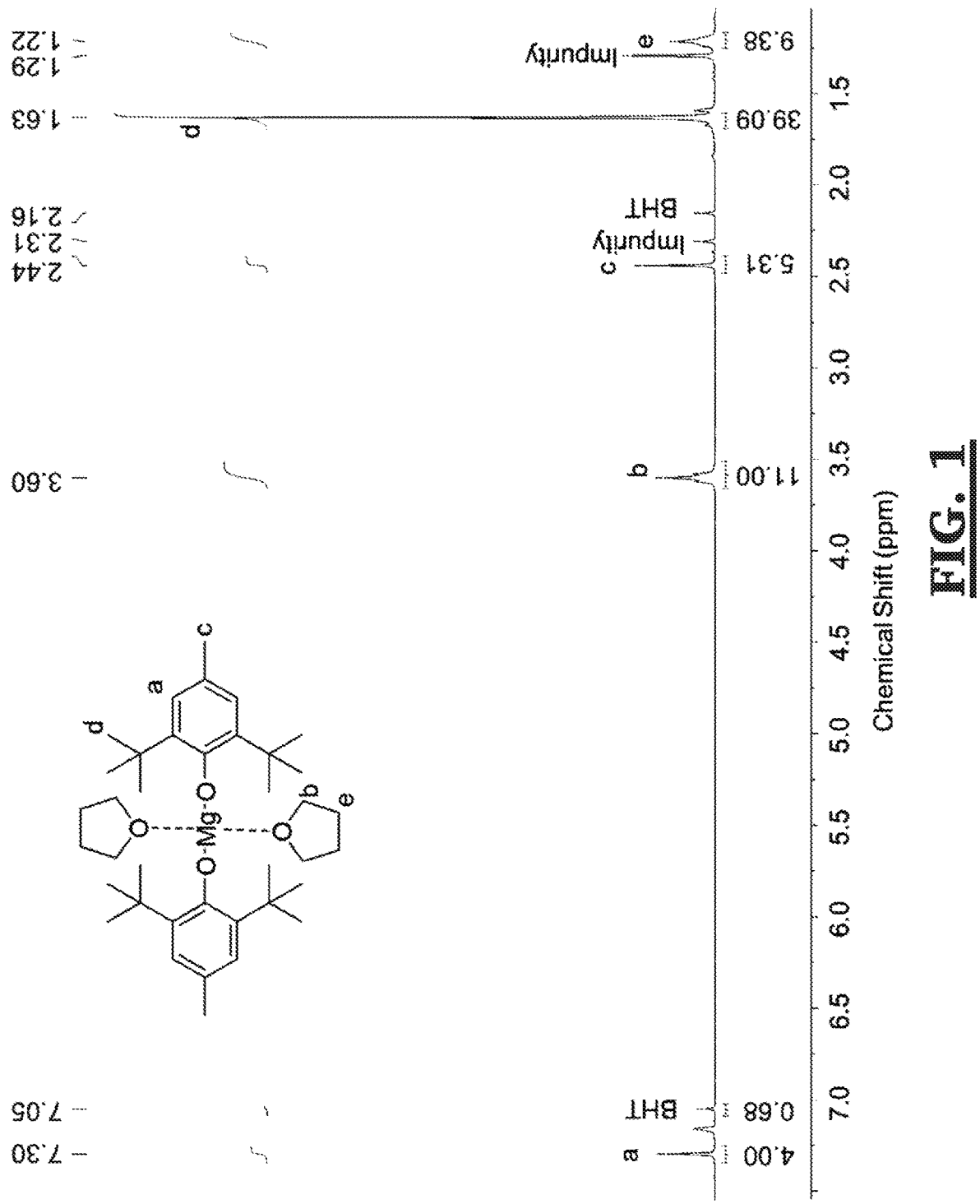
FIG. 1 is a $^1H$ NMR spectra of $Mg(BHT)_2(THF)_2$ synthesized using solvents toluene and hexanes as known in the prior art.

In one or more embodiments, the present invention is directed to a novel method for synthesizing $Mg(BHT)_2(THF)_2$, which has several advantages over previous methods. Dry toluene or pentane are not required for synthesizing the catalyst, and the reaction is done in a bulk solution of BHT and THF. Further, because the $Mg(BHT)_2(THF)_2$ is made in a one-step ("one-pot") synthesis, the time required for synthesizing and drying the catalyst is reduced. Using the new method of the present invention, the $Mg(BHT)_2(THF)_2$ is pure after removing excess THF, thereby eliminating the need for washes and recrystallization.

In various embodiments, the present invention is directed to a the method of making magnesium 2,6-di-tert-butyl-4-methylphenoxide.tetrahydrofuran (Mg(BHT)$_2$(THF)$_2$) catalyst comprising reacting di-n-butylmagnesium and 2,6-di-tert-butyl-4-methylphenol in excess anhydrous tetrahydrofuran (THF). In some embodiments, the Mg(BHT)$_2$(THF)$_2$ may be synthesized as shown in Scheme 1, below.

Scheme 1
Synthesis of Mg(BHT)$_2$(THF)$_2$ catalyst with excess THF

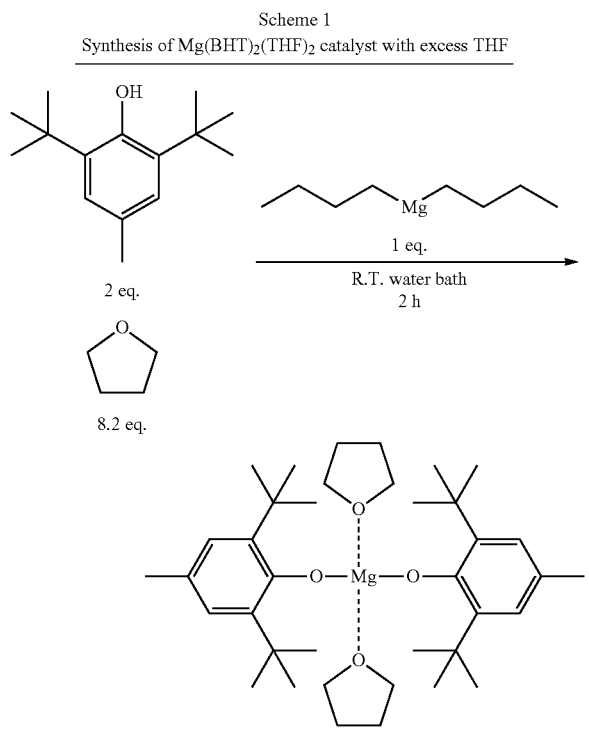

In these embodiments, di-n-butylmagnesium is first dissolved in a suitable solvent under anhydrous and oxygen free conditions to form a di-n-butylmagnesium solution. The di-n-butylmagnesium may be synthesized using any known method and is commercially available (Sigma-Aldrich (St Louis, MO)). The solvent used to dissolve the di-n-butyl-magnesium is not particularly limited, provided that: it does not react with or degrade the di-n-butylmagnesium or the other reagents discussed below; it is free of oxygen and water; it is able to form a solution up to 1M di-n-butylmagnesium; and it can easily be removed by evaporation at reduced pressure, by rotary evaporation or by other known means. Suitable solvents may include, without limitation, hexane, heptane, octane, or a combination thereof. In some embodiments, the di-n-butylmagnesium is dissolved in heptane. One of ordinary skill in the art will be able to select a suitable solvent for the di-n-butylmagnesium solution without undue experimentation.

In various embodiments, the concentration of di-n-butylmagnesium in said di-n-butylmagnesium solution is from about 0.5M to about 5.0M. In some of these embodiments, the concentration of di-n-butylmagnesium in said di-n-butylmagnesium solution is from about 0.5M to about 4.0M, in other embodiments, from about 0.5M to about 3.0M, in other embodiments, from about 0.5M to about 2.0M, in other embodiments, from about 0.5M to about 1.5M, in other embodiments, from about 0.75M to about 5.0M, in other embodiments, from about 1.5M to about 5.0M, in other embodiments, from about 2.5M to about 5.0M, and in other embodiments, from about 3.5M to about 5.0M. In some of these embodiments, the concentration of di-n-butylmagnesium in said di-n-butylmagnesium solution is 1M.

Next, 2,6,di-tert-butyl-4-methylphenol is dissolved in an excess of anhydrous, degassed tetrahydrofuran (THF) to form a 2,6,di-tert-butyl-4-methylphenol/THF solution in a suitable reaction vessel. As will be apparent, the THF must be dried to remove any water and degassed to remove any oxygen or other reactive gasses. The 2,6,di-tert-butyl-4-methylphenol can be synthesized using any known method and is commercially available from a variety of sources including, without limitation, Sigma-Aldrich (St Louis, MO). The reaction vessel is not particularly limited, provided that it can be thoroughly dried and sealed to prevent introduction of the ambient air into the vessel. The reaction will preferably be a sealed vessel with one or more inlet tubes to permit the addition of the reagents and an inert atmosphere without allowing ambient air or other contaminants to enter the vessel. In some embodiments, the reaction vessel will have a first inlet for inert gas and another inlet for addition of reagents. In some embodiments, the reaction vessel is a Schlenk flask. In some other embodiments, the reaction vessel is a 2-neck 500 mL flask. In some other embodiments, the reaction vessel is a 1 L 3-neck flask.

As will be apparent to those of skill in the art, the reaction where the Mg(BHT)$_2$(THF)$_2$ is formed should take place in completely anhydrous conditions, since any available water will exothermically react with di-n-butylmagnesium, resulting in Mg(OH)$_2$ impurities. For this reason, the reaction vessel should be thoroughly dried and free of reactive gasses, particularly oxygen, before use. In some embodiments, the reaction vessel may be a three-neck round bottom flask that was previously oven dried at 30° C. and allowed to cool down to room temperature under a nitrogen atmosphere. In some of these embodiments, the 2,6,di-tert-butyl-4-methylphenol is first added to the reaction vessel. The reaction vessel is then evacuated and purged with nitrogen, subjected to a vacuum for 30 minutes, and then filled with an inert atmosphere such as nitrogen gas, before the anhydrous degassed THF is added. In some embodiments, the contents of the reaction vessel may be stirred until all 2,6,di-tert-butyl-4-methylphenol is dissolved.

As will be also be apparent, the anhydrous THF serves both as a solvent for the 2,6,di-tert-butyl-4-methylphenol and as a reagent for forming the Mg(BHT)$_2$(THF)$_2$ catalyst. As such, far more anhydrous THF than would be required to dissolve the 2,6,di-tert-butyl-4-methylphenol is used. However, as used herein the term "excess," as applied to the amount of anhydrous THF used to form the 2,6,di-tert-butyl-4-methylphenol/THF solution, refers to a quantity of anhydrous THF that is greater than the amount of anhydrous THF needed to form the Mg(BHT)$_2$(THF)$_2$ catalyst.

In various embodiments, the volume of THF used in the method of the present invention will be sufficient to keep the 2,6,di-tert-butyl-4-methylphenol (BHT) from coming out of solution as the THF is consumed in the reaction that forms the Mg(BHT)$_2$(THF)$_2$ and will, accordingly, vary with quantity of BHT being used. As will be apparent, BHT that comes out of solution does not react to form the Mg(BHT)$_2$(THF)$_2$, resulting in lower yields and BHT impurities in the Mg(BHT)$_2$(THF)$_2$ catalyst produced. In smaller scale reactions (less than 20 g of Mg(BHT)$_2$(THF)$_2$ catalyst), it is believed that less THF is required, in part, because the reaction finishes before the BHT can come out of solution. In these embodiments, less than 8.2 mole equivalents of THF may be used. In some of these embodiments, from about 3.0 to about 8.2 mole equivalents of THF may be used. In some embodiments, from about 3.5 to about 8.2 mole equivalents, in other embodiments, from about 4.2 to about 8.2 mole equivalents, in other embodiments, from about 6.2 to about 8.2 mole equivalents, in other embodiments, from about 6.2 to about 8.2 mole equivalents, in other embodiments, from about 3.0 to about 7.2 mole equivalents, in other embodiments, from about 3.0 to about 6.2 mole equivalents, and in other embodiments, from about 3.0 to about 4.2 mole equivalents may be used.

In larger scale reactions (greater than 20 g $Mg(BHT)_2(THF)_2$ catalyst), more THF may be used to ensure that the BHT does not come out of solution as the THF is consumed in the reaction that forms the $Mg(BHT)_2(THF)_2$. In these embodiments, 8.2 or more mole equivalents of THF may be used. In some of these embodiments, from about 8.0 to about 20 mole equivalents of THF may be used. It should be appreciated, however, that while there is no theoretical limit on the amount of THF that may be used, using more THF than is required to obtain the benefits of the present invention (higher yields and increased purity) will significantly and unnecessarily increase the time required to remove the THF to recover the $Mg(BHT)_2(THF)_2$ catalyst produced in the reaction and wastes the additional THF. In some embodiments, from about 8.2 to about 20 mole equivalents, in other embodiments, from about 8.2 to about 16.4 mole equivalents, in other embodiments, from about 8.2 to about 14.0 mole equivalents, in other embodiments, from about 10 to about 20 mole equivalents, in other embodiments, from about 12 to about 20 mole equivalents, in other embodiments, from about 14 to about 20 mole equivalents, and in other embodiments, from about 16.4 to about 20 mole equivalents may be used. In some other embodiments, more than 20 mole equivalents may be used.

In various embodiments, the ratio of 2,6,di-tert-butyl-4-methylphenol to anhydrous THF in the 2,6,di-tert-butyl-4-methylphenol/THF solution is from about 1:1 to about 1:20. In some embodiments, the ratio of 2,6,di-tert-butyl-4-methylphenol to anhydrous THF from about 1:1 to about 1:1.05, in other embodiments, from about 1:2 to about 1:2.05, in other embodiments, from about 1:4 to about 1:4.1, in other embodiments, from about 1:8 to about 1:8.2, in other embodiments, from about 1:16 to about 1:16.4, in other embodiments, from about 1:2 to about 1:20, in other embodiments, from about 1:4 to about 1:20, and in other embodiments, from about 1:6 to about 1:20. In some embodiments, the ratio of 2,6,di-tert-butyl-4-methylphenol to anhydrous tetrahydrofuran (THF) in the 2,6,di-tert-butyl-4-methylphenol/THF solution is about 1:4.1. In some embodiments, the ratio of 2,6,di-tert-butyl-4-methylphenol to anhydrous tetrahydrofuran (THF) in the 2,6,di-tert-butyl-4-methylphenol/THF solution is about 1:8.2.

Next, di-n-butylmagnesium solution is added to the reaction vessel containing the 2,6,di-tert-butyl-4-methylphenol/THF solution, to allow the di-n-butylmagnesium to react with the 2,6,di-tert-butyl-4-methylphenol and THF to form the $Mg(BHT)_2(THF)_2$. In various embodiments, the di-n-butylmagnesium solution is slowly added to the reaction vessel at ambient or "room" temperature. As will be appreciated by those of skill in the art, however, this reaction is exothermic and once the reaction begins, steps should be taken to control the corresponding increase in temperature. In various embodiments, the temperature in the reaction vessel does not exceed 30° C. during the reaction, and preferably does not exceed 25° C. Reaction temperatures in excess of 60° C. may result in an exothermic runaway reaction. Accordingly, in one or more embodiments, the reaction vessel is placed in a water bath, ice bath, or other heat sink to dissipate the heat generated by the reaction. In some embodiments, the di-n-butylmagnesium solution is added dropwise to the 2,6,di-tert-butyl-4-methylphenol/THF solution over a water bath, ice bath, or other heat sink at ambient temperature. In various embodiments of the present invention, it has been found that adding the di-n-butylmagnesium solution to 2,6,di-tert-butyl-4-methylphenol/THF solution dropwise in a water bath is generally sufficient to regulate the temperature of the reaction vessel and prevent the temperature from rising above 30° C.

The molar ratio of the di-n-butylmagnesium to the 2,6,di-tert-butyl-4-methylphenol in the reaction vessel is generally from about 1:2 to about 1:2.05, preferably from about 1:2 to about 1:2.03, and is most preferably about 1:2. In some embodiments, the molar ratio of the di-n-butylmagnesium to the 2,6,di-tert-butyl-4-methylphenol in the reaction vessel is about 1:2.

In one or more embodiments, the contents of the reaction vessel are stirred or agitated for from about 90 to about 210 min or until substantially all of the di-n-butylmagnesium and 2,6,di-tert-butyl-4-methylphenol have reacted. In some embodiments, the contents of the reaction vessel are stirred or agitated for from about 90 to about 180 min, in other embodiments, from about 90 min to about 150 min, in other embodiments, from about 120 min to about 210 min, in other embodiments, from about 150 min to about 210 min, in other embodiments, from about 180 min to about 210 min, and in other embodiments, from about 120 min to about 180 min. In some embodiments, the contents of the reaction vessel are stirred or agitated for about 2 hours. In some other embodiments, the contents of the reaction vessel are stirred or agitated for about 3 hours.

Finally, the unreacted THF and remaining solvent is removed to produce the $Mg(BHT)_2(THF)_2$ catalyst. The method of solvent removal is not particularly limited and any method known in the art for that purpose may be used, provided that such a method does not damage the newly formed $Mg(BHT)_2(THF)_2$ catalyst. In some embodiments, the unreacted THF and remaining solvent is removed by evaporation under reduced pressure.

In various embodiments, the method of the present invention can be used to prepare $Mg(BHT)_2(THF)_2$ catalyst at yields of 80 wt % or more, preferably 93 wt % or more, and more preferably 97 wt % or more. Yields of 97 wt % or more are a significant and unexpected improvement over yields achievable using prior methods. For example, the method described by Calabrese et al. (see, Calabrese, J.; Cushing, M. A; Ittel, S. D., "Sterically hindered magnesium aryloxides." *Inorganic Chemistry* 1988, 27 (5), 867-870, the disclosure of which is incorporated herein by reference in its entirety), which requires the use of dry toluene and pentane, reports a yield of only 88% after rechrystalization. The prior art method outlined by Nifant'ev et al. (see, Nifant'ev et al. See, Nifant'ev, I. E.; Shlyakhtin, A.V.; Bagrov, V. V.; Minyaev, M. E.; Churakov, A V.; Karchevsky, S. G.; Birin, K. P.; Ivchenko, P. V., "Mono-BHT heteroleptic magnesium complexes: synthesis, molecular structure and catalytic behavior in the ring-opening polymerization of cyclic esters." *Dalton Transactions* 2017, 46 (36), 12132-12146, the disclosure of which is incorporated herein by reference in its entirety) reports a $Mg(BHT)_2(THF)_2$ yield of 90%, but also requires a recrystalization step.

Figure 2:
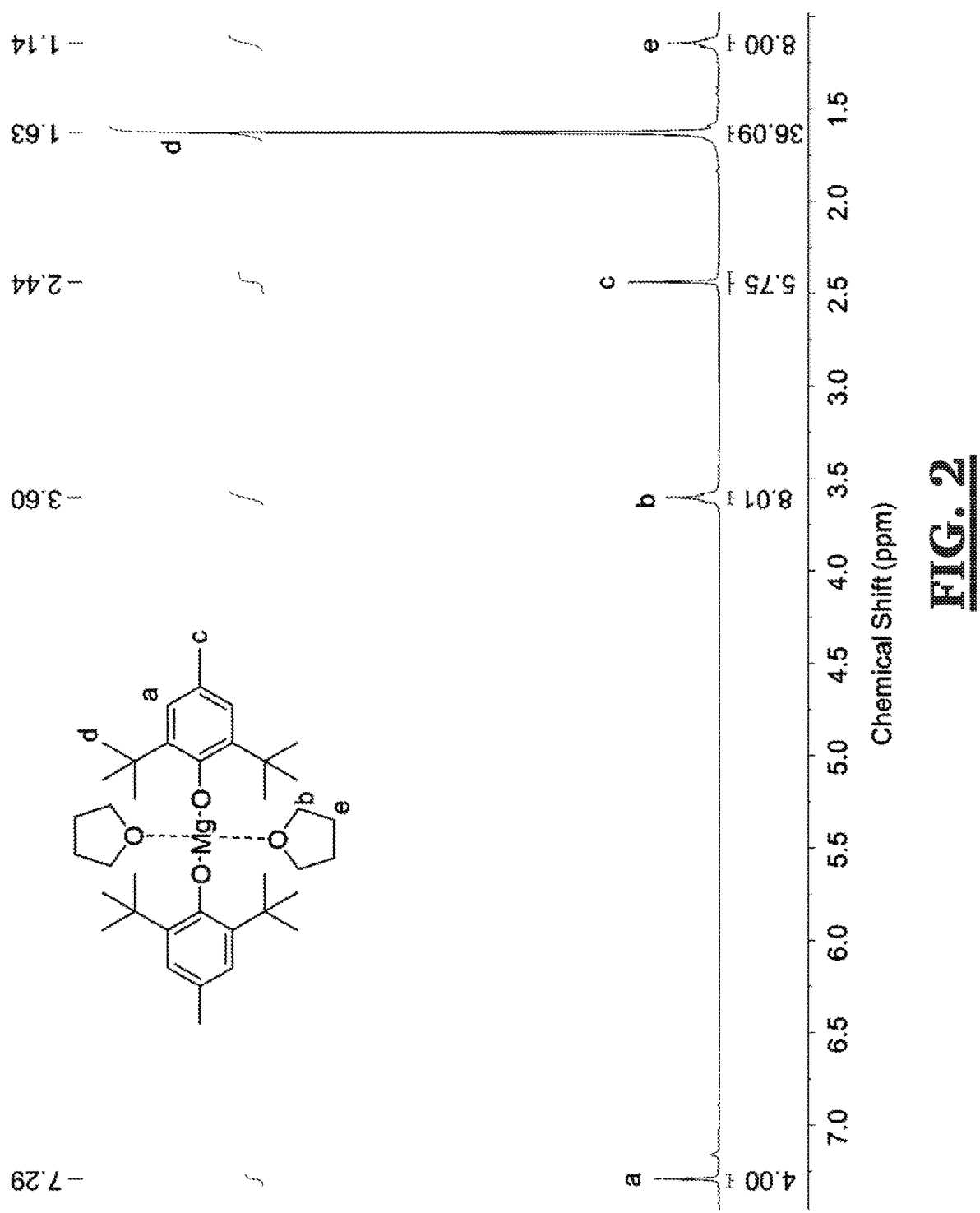
FIG. 2 is a $^1H$ NMR spectrum of $Mg(BHT)_2(THF)_2$ (300 MHz, $C_6D_6$) synthesized according to the method of the present invention.
Figure 3:
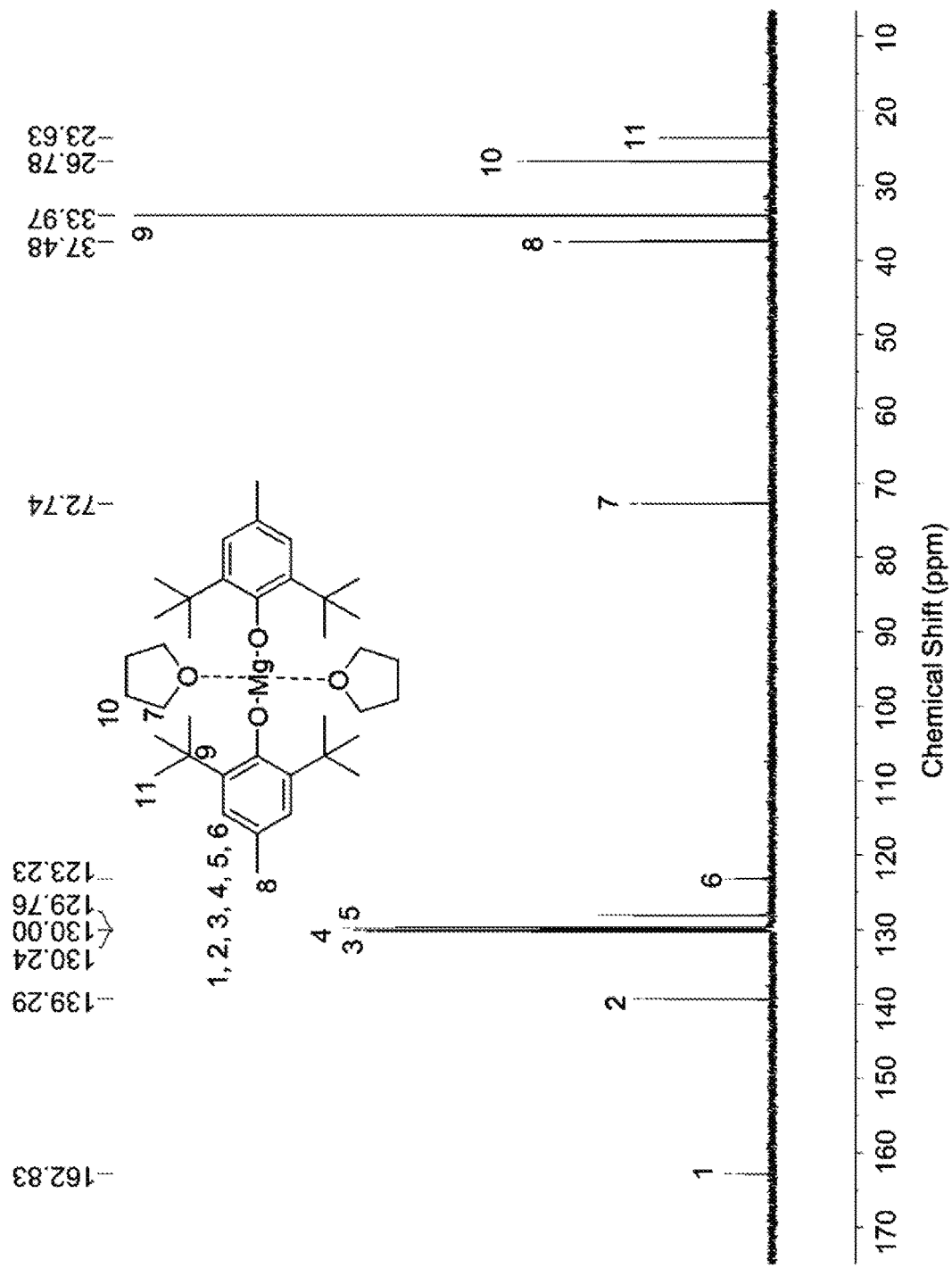
FIG. 3 is a $^{13}C$ NMR spectrum of $Mg(BHT)_2(THF)_2$ (100 MHz, $C_6D_6$) synthesized according to the method of the present invention.
Figure 4:
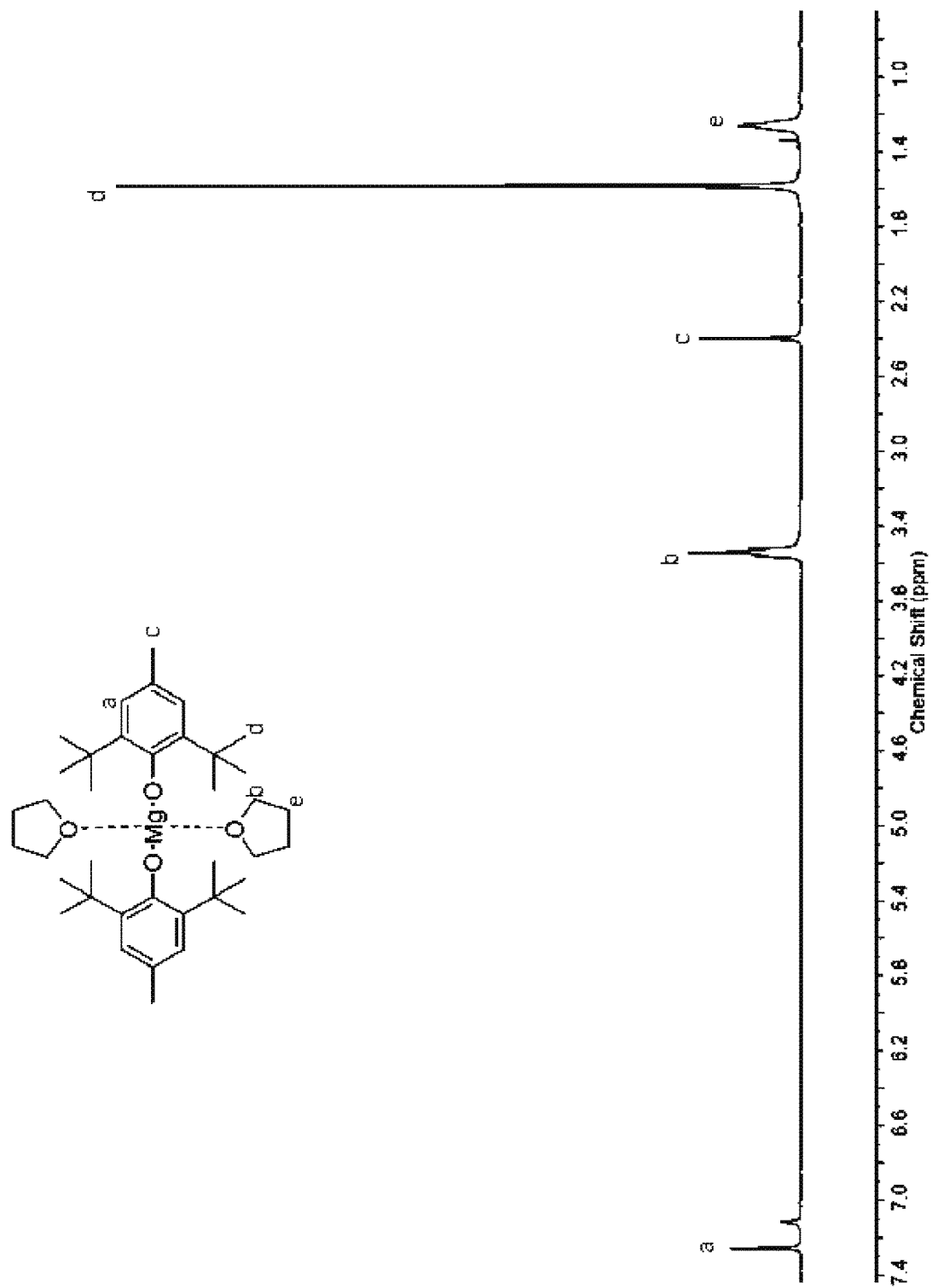
FIG. 4 is $^1H$ NMR spectra of $Mg(BHT)_2(THF)_2$ catalyst at 105 g scale synthesized according to the method of the present invention.

Similarly, in one or more embodiments, the method of the present invention can be used to prepare $Mg(BHT)_2(THF)_2$ catalyst with a purity of 98% (by weight) or more, which is a significant and unexpected improvement over purity achievable using prior methods. As can be seen in FIGS. 1-4, Mg(BHT)$_2$(THF)$_2$ catalysts prepared using prior art methods contain significant residual BHT and other impurities (FIG. 1), that are absent in the Mg(BHT)$_2$(THF)$_2$ catalysts of the present invention (FIGS. 2-4).

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of (Mg(BHT)$_2$(THF)$_2$) using Toluene and Hexanes (Prior Art)

Mg(BHT)$_2$(THF)$_2$ was synthesized using the prior art reaction mechanism shown in Scheme 2, below. A solution of di-n-butylmagnesium (1M in heptane, 30 mL, 30 mmol) was added dropwise to a solution of 2,6-di-tert-butyl-4-methylphenol (13.22 g, 60 mmol) in dry, degassed toluene (60 mL) with stirring at room temperature to form (Mg(BHT)$_2$)$_2$. The solution was stirred for a further 2 h before the solvent was removed under reduced pressure. The Mg(BHT)$_2$)$_2$ was then dissolved in dry, degassed hexane (50 mL) before dry, degassed tetrahydrofuran (5 mL) was added dropwise with stirring to form Mg(BHT)$_2$(THF)$_2$. The reaction was stirred for a further 2 h before removing solvent under reduced pressure. The Mg(BHT)$_2$(THF)$_2$ was vacuum dried overnight. Conversion: 85%. (See FIG. 1)

Scheme 2
Prior Art Synthesis of magnesium 2,6-di-tert-butyl-4-methylphenoxide (Mg(BHT)$_2$(THF)$_2$)

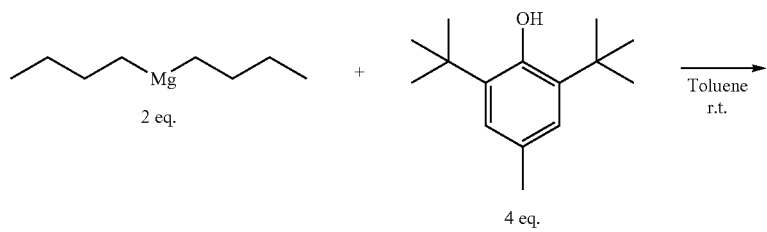

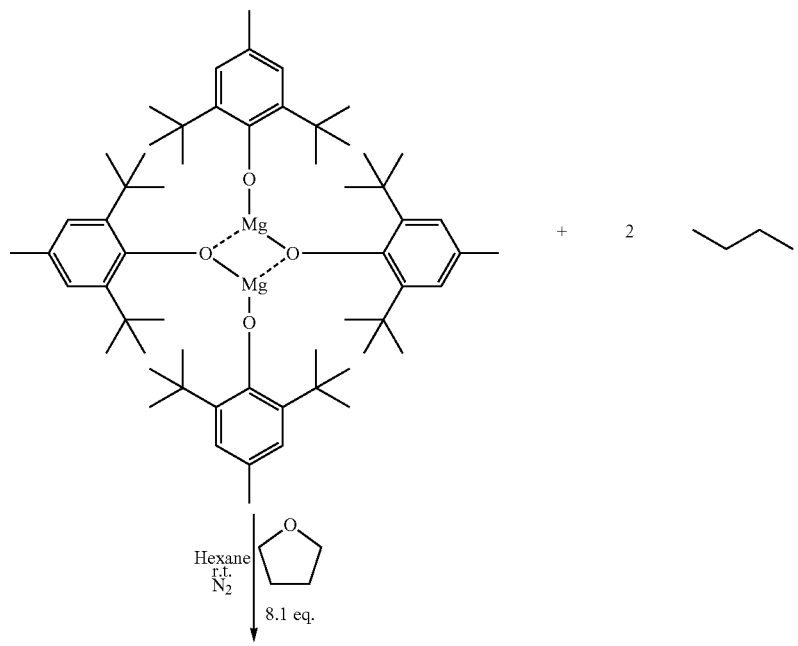

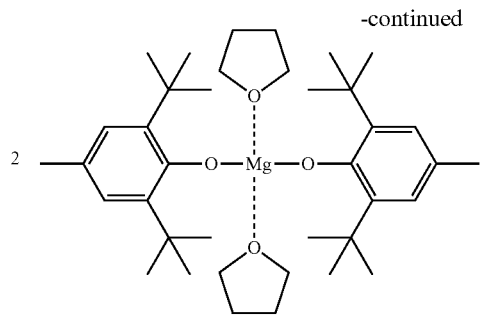

Example 2

Synthesis of magnesium 2,6-di-tert-butyl-4-methylphenoxide (Smaller Scale)

A solution of di-n-butylmagnesium (1M in heptane, 30 mL, 30 mmol) was added dropwise to a solution of 2,6-di-tert-butyl-4-methylphenol (13.22 g, 60 mmol) dissolved in dry tetrahydrofuran (20 mL) over a water bath at room temperature. See Scheme 3, below. The solution was stirred for a further 2 h before removing residual tetrahydrofuran under reduced pressure. The dried material was a white solid crystalline powder. Yield=93% $^1$H NMR (300 MHz, 298 K, C6D6): δ=7.28 (s, BHT Ar), 3.59, THF CH$_2$CH$_2$O), 2.43 (s, BHT CH$_3$Ar), 1.62 (s, BHT (CH$_3$)$_3$CAr), 1.13 (m, THF CH$_2$CH$_2$O). $^{13}$C NMR (100 MHZ, 298 K, C$_6$D$_s$): δ=163.4, 139.8, 130.8, 130.6, 130.3, 123.8 (BHT ArC), 73.3 (THF CH$_2$CH$_2$O), 38.0 (BHT) ArCH$_3$), 34.5 (BHT ArC(CH$_3$)$_3$), 27.3, (THF CH$_2$CH$_2$O), 24.2 (BHT ArC(CH$_3$)$_3$) ppm. (See, FIGS. 2 and 3)[.]

Scheme 3
Synthesis of magnesium Mg(BHT)$_2$(THF)$_2$ by adding di-n-butyl magnesium to a solution of 2,6-di-tert-butyl-4-methylphenol and tetrahydrofuran.
(Smaller Scale)

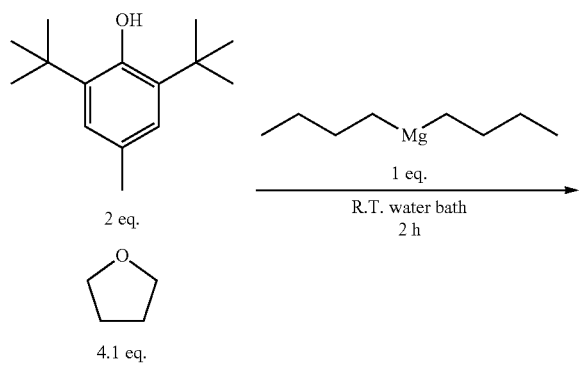

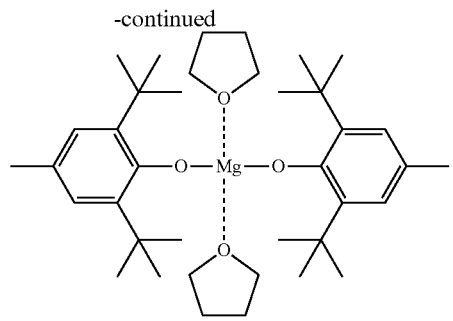

Example 3

Mg(BHT)$_2$(THF)$_2$ Reaction Standard Operating Procedure (Larger Scale)

2,6-di-tert-butyl-4-methylphenol (BHT) (79.32 g, 360 mmol) was placed into three-neck round bottom flask that was previously oven dried at 30° C. and allowed to cool down to room temperature under a nitrogen atmosphere. After BHT addition, the flask was evacuated and purged with nitrogen three times, was subjected to vacuum for 30 minutes, and then filled with a nitrogen atmosphere. Dry, degassed tetrahydrofuran (240 mL, 2952 mmol) was added and stirred until all BHT was dissolved. The round bottom flask was placed into a water bath at room temperature, and a solution of di-n-butylmagnesium (1M in heptane, 180 mL, 180 mmol) was added dropwise to the THF-BHT solution. See Scheme 3, above. The temperature of the bath did not exceed 30° C., and the reaction was allowed to stir for 3 h. The heptane and excess THF were removed by vacuum overnight, and a white solid formed in the flask. The flask was moved into a nitrogen glovebox, broken down into a powder, and placed under vacuum to remove residual THF or heptane. Yield=97% (See, FIG. 4)

Example 4

Mg(BHT)$_2$(THF)$_2$ Reaction Standard Operating Procedure (Larger Scale)

A solution of di-n-butylmagnesium (1M in heptane, 180 mL, 180 mmol) was added dropwise to a solution of 2,6-di-tert-butyl-4-methylphenol (79.32 g, 360 mmol) dissolved in dry, degassed tetrahydrofuran (240 mL) in an oven dried, three-neck round bottom flask under a nitrogen atmosphere. See Scheme 4, below. This was done over a water bath at room temperature, and the temperature of the bath did not exceed 30° C. throughout the addition. The reaction was allowed to stir for 3 h before heptane and excess THF were removed under vacuum. The flask was moved into a nitrogen glovebox, broken down into a powder, and then placed under vacuum to remove residual heptane or THF. Yield=97%

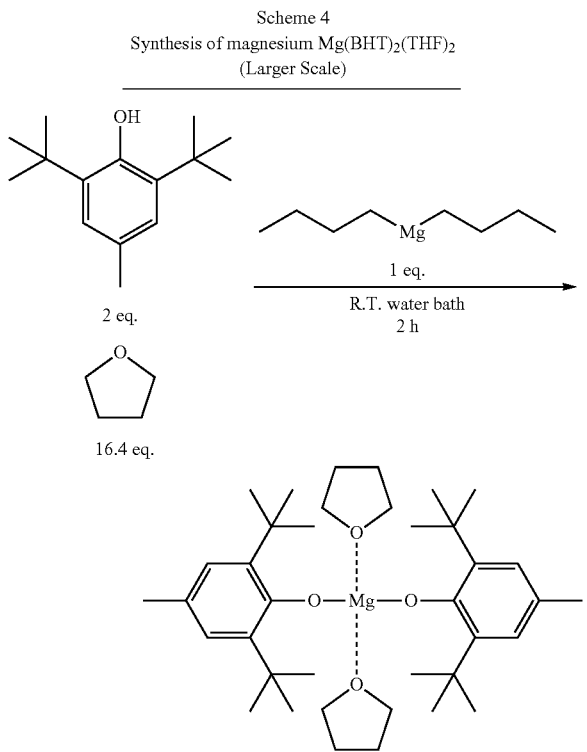

Scheme 4
Synthesis of magnesium Mg(BHT)$_2$(THF)$_2$
(Larger Scale)

In light of the foregoing, it should be appreciated that the present invention significantly advances the art by providing a Mg(BHT)$_2$(THF)$_2$ catalyst (and method of its synthesis) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method for making a magnesium 2,6-di-tert-butyl-4-methylphenoxide·tetrahydrofuran (Mg(BHT)$_2$(THF)$_2$) catalyst comprising:
    A) dissolving di-n-butylmagnesium in a suitable solvent to form a di-n-butylmagnesium solution;
    B) dissolving 2,6-di-tert-butyl-4-methylphenol in anhydrous tetrahydrofuran (THF) to form a 2,6-di-tert-butyl-4-methylphenol/THF solution; and
    C) adding the di-n-butylmagnesium solution to said 2,6,di-tert-butyl-4-methylphenol/THF solution; wherein said di-n-butylmagnesium reacts with said 2,6,di-tert-butyl-4-methylphenol and THF to form the Mg(BHT)$_2$(THF)$_2$ catalyst,
        wherein the yield of said Mg(BHT)$_2$(THF)$_2$ catalyst is 93% or greater by weight and the purity of said Mg(BHT)$_2$(THF)$_2$ catalyst is 98% or more without recrystallization.

2. The method of claim 1 wherein the suitable solvent (step A) is selected from hexane, heptane, octane, and combinations thereof.

3. The method of claim 1 wherein the concentration of di-n-butylmagnesium in said di-n-butylmagnesium solution is from about 0.5 to about 5.0.

4. The method of claim 1 wherein the concentration of di-n-butylmagnesium in said di-n-butylmagnesium solution is 1M.

5. The method of claim 1 wherein the molar ratio of di-n-butylmagnesium to 2,6,di-tert-butyl-4-methylphenol in step C is from about 1:2 to about 1:2.05.

6. The method of claim 1 wherein the step of adding further comprises adding the di-n-butylmagnesium solution dropwise to said 2,6,di-tert-butyl-4-methylphenol/THF solution over a water bath, ice bath, or heat sink at ambient temperature.

7. The method of claim 1 further comprising:
    D) stirring the combination of step C until substantially all of the di-n-butylmagnesium and 2,6,di-tert-butyl-4-methylphenol have reacted; and
    E) removing any unreacted THF and remaining solvent to produce the Mg(BHT)$_2$(THF)$_2$ catalyst.

8. The method of claim 7 wherein the step of stirring (Step D) comprises stirring the combination of step C for from about 90 min to about 210 min.

9. The method of claim 7 wherein the step of removing (step E) comprises removing unreacted THF and remaining solvent by evaporation under reduced pressure.

10. A one pot method for making a magnesium catalyst comprising:
    A) reacting di-n-butylmagnesium, a 2,6,di-tert-butyl-4-methylphenol solution, and anhydrous tetrahydrofuran (THF) at ambient temperature over a water bath, ice bath, or heat sink to form magnesium 2,6-di-tert-butyl-4-methylphenoxide· tetrahydrofuran (Mg(BHT)$_2$(THF)$_2$) catalyst; and
    B) removing any remaining THF and solvent to produce a Mg(BHT)$_2$(THF)$_2$ catalyst with a yield of said Mg(BHT)$_2$(THF)$_2$ catalyst of a 93% or greater by weight and a purity of 98% or more without recrystallization.

11. The one pot method of claim 10 wherein said di-n-butylmagnesium is dissolved in heptane.

12. The one pot method of claim 10 wherein the molar ratio of di-n-butylmagnesium to 2,6,di-tert-butyl-4-methylphenol in the step of reacting (step A) is from about 1:2 to about 1:2.05.

13. The one pot method of claim 10 wherein the step of reacting (step A) further comprises:
    1) Dissolving di-n-butylmagnesium in a suitable solvent to form a di-n-butylmagnesium solution
    2) Combining the 2,6,di-tert-butyl-4-methylphenol and the anhydrous THF in a suitable reaction vessel to form a 2,6,di-tert-butyl-4-methylphenol and THE solution;
    3) Adding the di-n-butylmagnesium solution dropwise to said 2,6,di-tert-butyl-4-methylphenol and THE solution over a water bath, ice bath or heat sink at ambient temperature to form a Mg(BHT)$_2$(THF)$_2$ catalyst; and
    4) Stirring the combination of step (2) for from about 90 min to about 210 min or until all of the di-n-butylmagnesium and 2,6,di-tert-butyl-4-methylphenol have reacted with THF to form the Mg(BHT)$_2$(THF)$_2$ catalyst.

14. The one pot method of claim 10 wherein the step of removing (step B) comprises removing unreacted THF and solvent by evaporation under reduced pressure.

15. The one pot method of claim 10 wherein the yield of the Mg(BHT)$_2$(THF)$_2$ catalyst is 97% or greater by weight.

16. A method for making magnesium 2,6-di-tert-butyl-4-methylphenoxide·tetrahydrofuran (Mg(BHT)$_2$(THF)$_2$) catalyst comprising:
   A) dissolving di-n-butylmagnesium in hexane, heptane, or octane to form a 1M di-n-butylmagnesium solution;
   B) dissolving 2,6,di-tert-butyl-4-methylphenol in anhydrous tetrahydrofuran (THF) to form a 2,6,di-tert-butyl-4-methylphenol/THF solution;
   C) combining said di-n-butylmagnesium solution of Step A and said 2,6,di-tert-butyl-4-methylphenol/THF solution of Step B at a molar ratio of di-n-butylmagnesium to 2,6-di-tert-butyl-4-methylphenol of from about 1:2 to about 1:2.05 by adding the di-n-butylmagnesium solution of step A dropwise to the 2,6,di-tert-butyl-4-methylphenol/THF solution of step B over a water bath, ice bath, or heat sink at ambient temperature to form a Mg(BHT)$_2$(THF)$_2$ catalyst;
   D) stirring or agitating the combination of step C for from about 90 min to about 210 min or until substantially all of the di-n-butylmagnesium and 2,6,di-tert-butyl-4-methylphenol have reacted with THF to form the Mg(BHT)$_2$(THF)$_2$ catalyst; and
   E) removing any unreacted THF and solvent by evaporation under reduced pressure or rotary evaporation to produce the Mg(BHT)$_2$(THF)$_2$ catalyst, wherein the yield of said Mg(BHT)$_2$(THF)$_2$ catalyst is 93% or greater by weight and the purity of said Mg(BHT)$_2$(THF)$_2$ catalyst is 98% or more without recrystallization.

17. The method of claim 16 wherein the yield of the Mg(BHT)$_2$(THF)$_2$ catalyst is 97% or greater by weight.

* * * * *